(12) United States Patent
Chao

(10) Patent No.: US 6,357,973 B2
(45) Date of Patent: Mar. 19, 2002

(54) CONNECTION DEVICE OF BORING SAW

(76) Inventor: Walley Chao, 3F, No. 157, Sec. 1, Mei Tsun Rd., Taichung (TW)

(*) Notice: Subject to any disclaimer, the term of this patent is extended or adjusted under 35 U.S.C. 154(b) by 0 days.

(21) Appl. No.: 09/749,396

(22) Filed: Dec. 28, 2000

(51) Int. Cl.$^7$ .............................................. B23B 51/04
(52) U.S. Cl. ..................................... 408/204; 408/206
(58) Field of Search ............................... 408/204, 206, 408/207, 209, 703

(56) References Cited

U.S. PATENT DOCUMENTS

| 3,758,221 A | * | 9/1973 | Meshulam | 408/204 |
| 5,597,274 A | * | 1/1997 | Behner | 408/204 |
| 5,658,102 A | * | 8/1997 | Gale | 408/204 |
| 5,868,532 A | * | 2/1999 | Spenser | 408/204 |
| 5,967,709 A | * | 10/1999 | Thuesen | 408/204 |
| 6,120,221 A | * | 9/2000 | Alm | 408/204 |

* cited by examiner

Primary Examiner—Daniel W. Howell
(74) Attorney, Agent, or Firm—Browdy and Neimark P.L.L.C.

(57) ABSTRACT

A connection device is, designed to connect a boring saw to a rotating tool and is formed of a shaft, a locating member, a sleeve, and a nut. The shaft is provided with a shaft hole to receive a bit, and a connection portion for fastening the shaft with the rotating tool, a first outer threaded portion which is engaged with the nut, and a second outer threaded portion which is engaged with the inner threaded portion of the rotating body of the boring saw. The shaft is fitted into the sleeve which is urged by the nut to press against the rotating body to be fastened securely with the rotating tool.

3 Claims, 5 Drawing Sheets

CONNECTION DEVICE OF BORING SAW

FIELD OF THE INVENTION

The present invention relates generally to a boring tool, and more particularly to a connection device of the boring tool.

BACKGROUND OF THE INVENTION

As shown in FIGS. 1 and 2, a prior art boring saw comprises a rotating tool (not shown in the drawings), a rotating body 2, a bit 5, and a connection device 6. The rotating body 2 and the bit 5 are driven by the rotating tool. The connection device 6 is used to connect the rotating tool, the rotating body 2, and the bit 5.

The rotating body 2 is provided with an inner threaded portion 3 and four locating holes 4. The connection device 6 comprises a shaft 7, a locating member 15, and a nut 19. The shaft 7 has a shaft hole 8, a connection portion 9, an urging ring 10 provided with two through holes 11, a first outer threaded portion 12, and a second outer threaded portion 13. The locating member 15 has an annular portion 16 and two insertion pins 17.

In combination, the bit 5 is first inserted into the shaft 7 before the inner threaded portion 3 of the rotating body 2 is engaged with the second outer threaded portion 13 of the shaft 7. The urging ring 10 of the shaft 7 is urged by the rotating body 2. The locating member 15 is fitted over the shaft 7 such that the two insertion pins 17 of the locating member 15 are inserted into the two through holes 11 of the urging ring 10 and the two locating holes 4 of the rotating body 2. The nut 19 is engaged with the first outer threaded portion 12 of the shaft 7 such that the nut 19 urges the locating member 15, which is in an intimate contact with the urging ring 10. The insertion portion 9 of the shaft 7 is finally connected with the rotating tool.

When the locating hole 4 of the rotating body 2 is corresponding in location to the through hole 11 of the urging ring 10 of the shaft 7, so as to facilitate the disposing of the insertion pin 17 of the locating member 15, the rotating body 2 is not necessarily in an intimate contact with the urging ring 15, thereby resulting in formation of a gap which is the culprit for causing the rotating body 2 in motion to sway aside. As a result, the holes bored by such a boring saw have a rough edge. In addition, the rotating body 2 is vulnerable to severance while in operation.

SUMMARY OF THE INVENTION

The primary objective of the present invention is to provide a connection device capable of connecting securely a rotating tool with a rotating body of the boring saw.

The connection device of the present invention comprises a shaft, a locating member, a sleeve, and a nut. The shaft comprises a shaft hole to receive a bit, a connection portion for connecting the rotating tool, an urging ring having two through holes, a first outer threaded portion located between the connection portion and the urging ring, and a second threaded portion which is engaged with an inner threaded portion of the rotating body. The locating member comprises an annular portion and two insertion pins. The sleeve is used to fit over the locating member and the urging ring of the shaft. The nut is engaged with the first outer threaded portion for pressing the open end of the sleeve to urge intimately the rotating body.

DETAILED DESCRIPTION OF THE INVENTION

Figure 1:
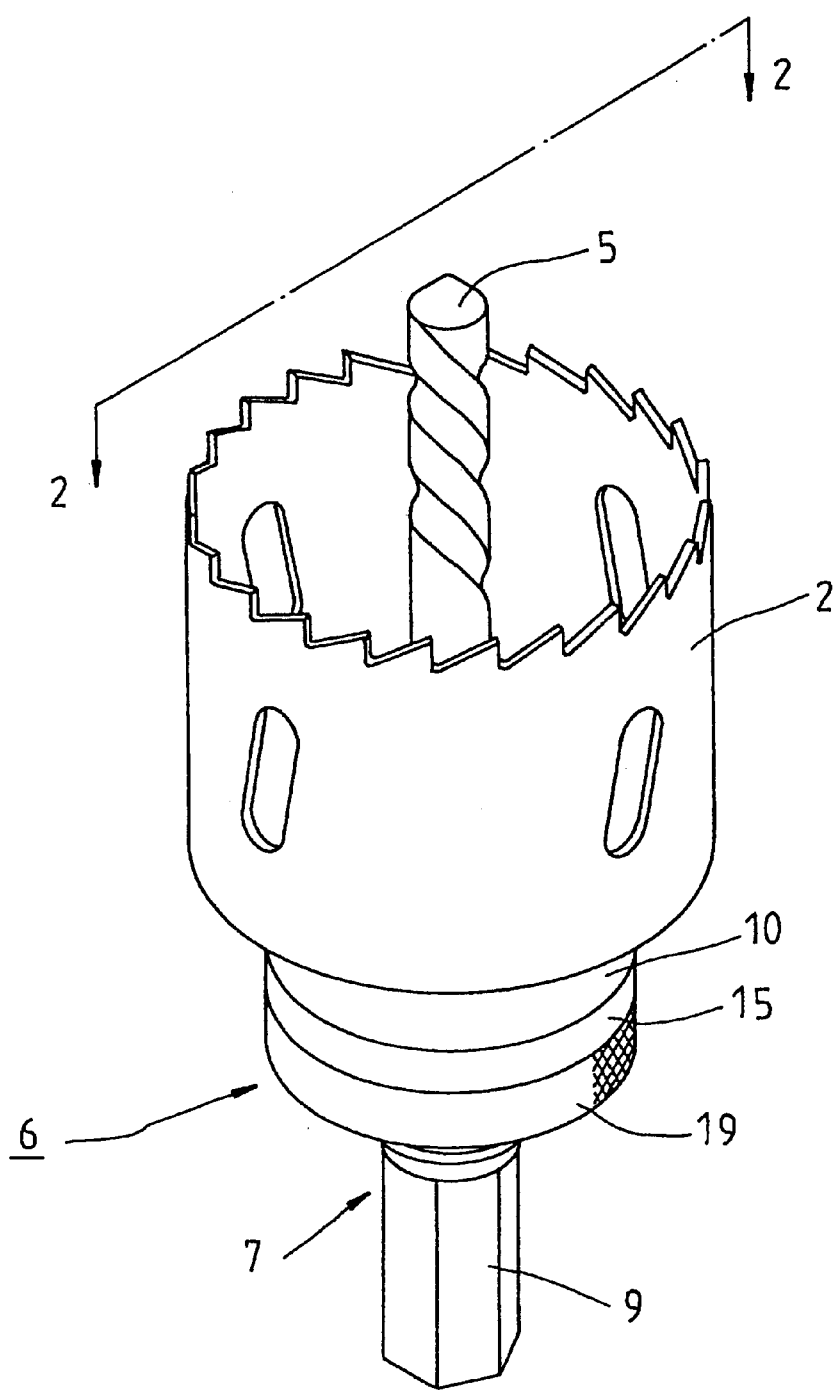
FIG. 1 shows an exploded view of the prior art.
Figure 2:
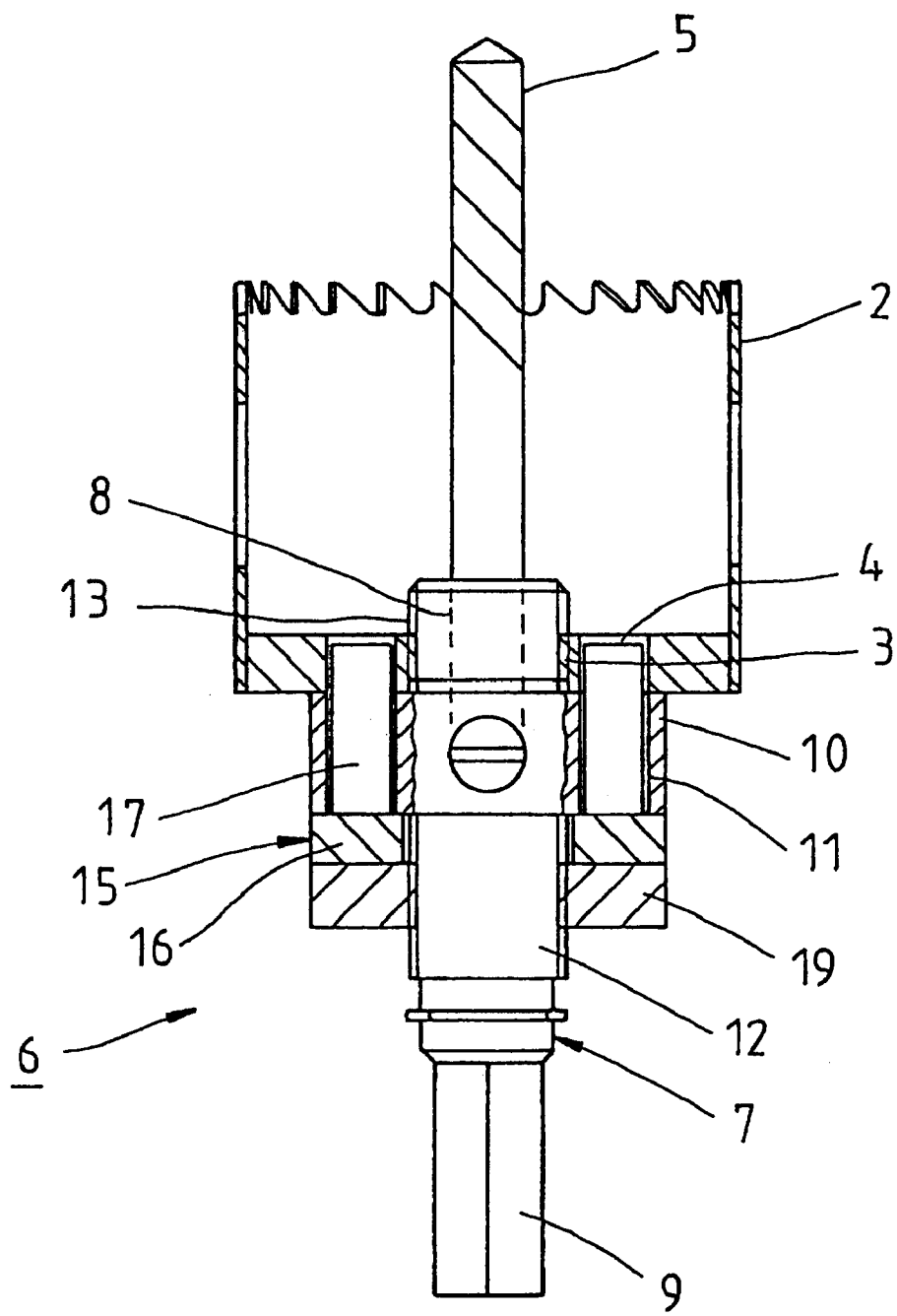
FIG. 2 shows a sectional view taken along the direction indicated by a line 2—2 as shown in FIG. 1.
Figure 3:
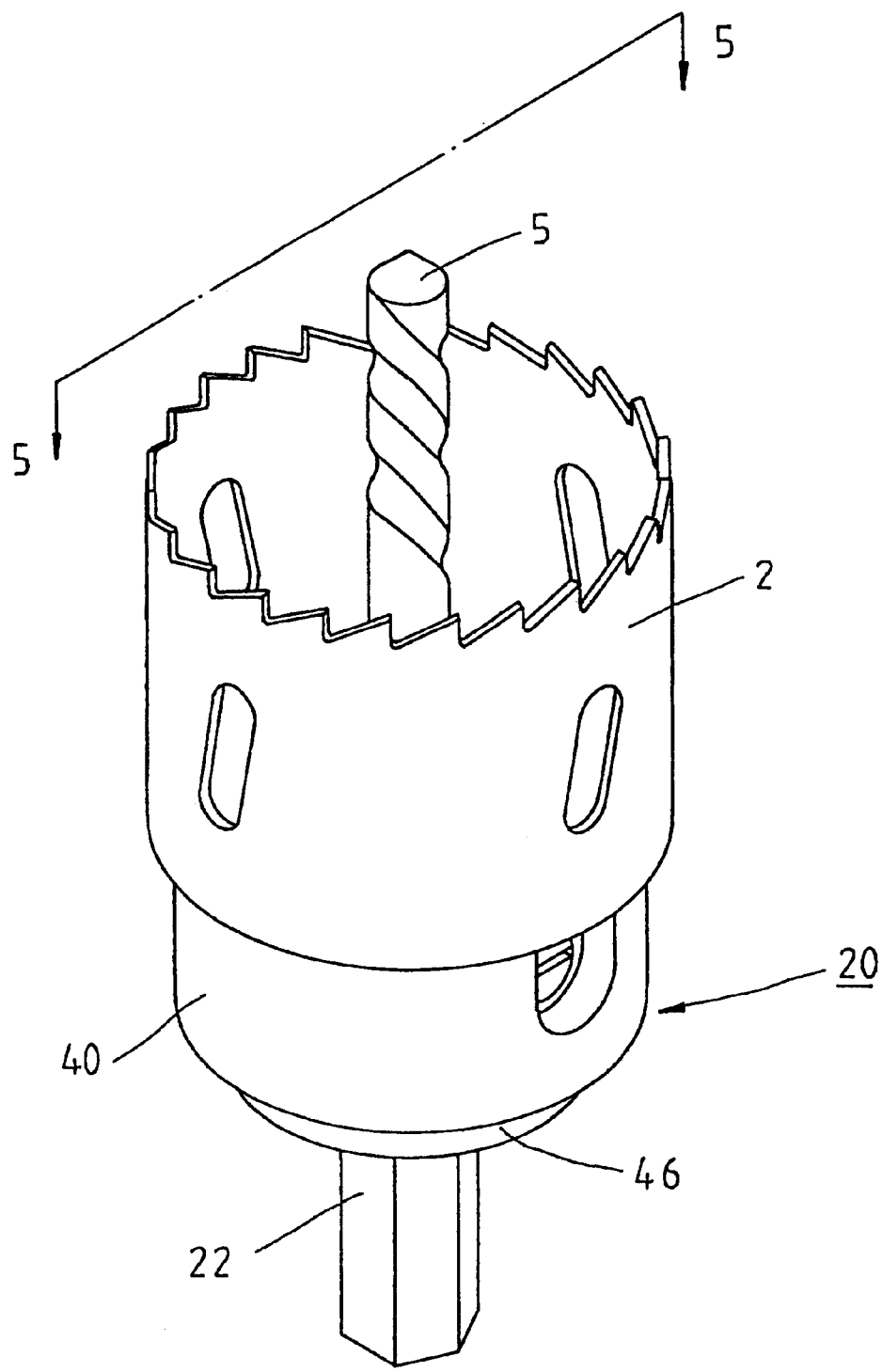
FIG. 3 shows a perspective view of a first preferred embodiment of the present invention.
Figure 4:
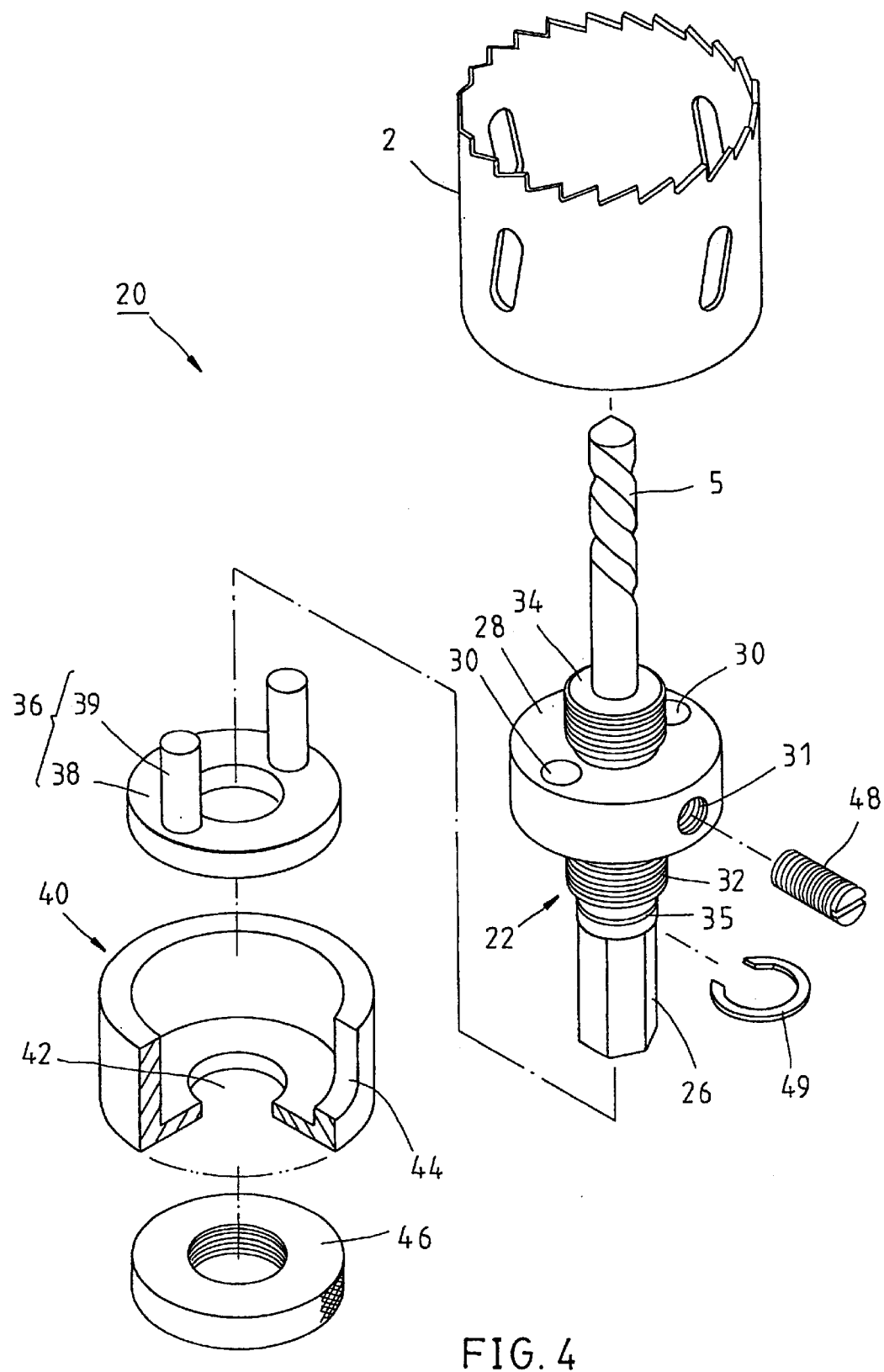
FIG. 4 shows an exploded view of the first preferred embodiment of the present invention.
Figure 5:
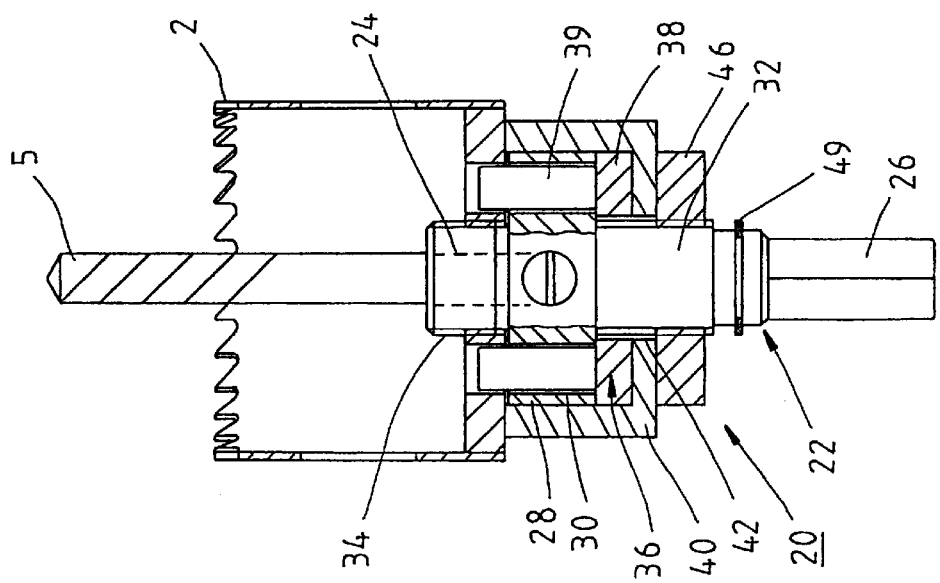
FIG. 5 shows a sectional view taken along the direction indicated by a line 5—5 as shown in FIG. 5.

As shown in FIGS. 3–5, a connection device 20 embodied in the present invention is mounted on a boring saw, and is formed of a shaft 22, a locating member 36, a sleeve 40, and a nut 46.

The shaft 22 comprises a shaft hole 24 for receiving a bit 5, a connection portion 26 located at the bottom end of the shaft 22 for connecting a rotating tool, an urging ring 28 extending radially from the shank of the shaft 22 and having two through holes 30 extending along the longitudinal direction of the shaft 22, a threaded hole 31 in communication with the shaft hole 24, a first outer threaded portion 32 located between the connection portion 26 and the urging ring 28, a second outer threaded portion 34 located at the top end of the shaft 22, and an annular slot 35 located between the connection portion 26 and the first outer threaded portion 32. The connection portion 26 has an outer edge of a hexagonal cross section.

The locating member 36 comprises an annular portion 38 and two insertion pins 39 extending upward and vertically from the annular portion 38.

The sleeve 40 has a closed end which is provided in the center with a round through hole 42. The sleeve 40 is provided in the side edge with a U-shaped slot 44.

The nut 46 is engaged with the first outer threaded portion 32 of the shaft 22.

In combination, the bit 5 is inserted into the shaft 22 such that the bit 5 is fastened by a bolt 48 which is engaged with the threaded hole 31 of the urging ring 28. The inner threaded portion 3 of the rotating body 2 is engaged with the second outer threaded portion 34 of the shaft 22 such that the locating hole 4 of the rotating body 2 is corresponding in location to the through hole 30 of the urging ring 28, and that the rotating body 2 is as close as possible to the urging ring 28. The locating member 36 is fitted over the shaft 22 such that the two insertion pins 39 are disposed in the two through holes 30 of the urging ring 28 and the two locating holes 4 of the rotating body 2. The locating member 36 and the rotating body 2 are actuated by the shaft 22 to rotate. The sleeve 40 is fitted over the shaft 22, the locating member 36, and the urging member 28. The nut 46 is engaged with the first outer threaded portion 32 of the shaft 22 such that the nut 46 urges the sleeve 40 to be in an intimate contact with the rotating body 2. The nut 46 is secured in place by a C-shaped retaining ring 49 which is disposed in an annular groove 35 of the shaft 22. The connection portion 26 of the shaft 22 is connected with the rotating tool.

In light of the intimate contact of the sleeve 40 with the rotating body 2, the rotating body 2 does not sway aside in relation to the connection device 20. In other words, the rotating body 2 is securely connected with the rotating tool by the connection device 20.

Figure 6:
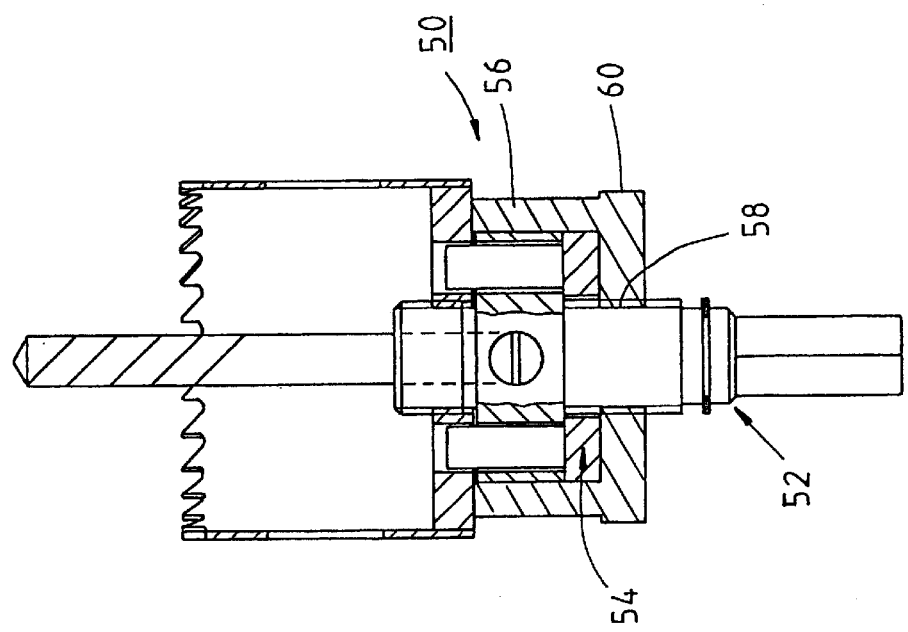
FIG. 6 shows a sectional view of a second preferred embodiment of the present invention.

As shown in FIG. 6, a connection device 50 of the second preferred embodiment of the present invention is basically similar in construction to that of the first preferred embodiment described above, except that the connection device 50 is devoid of the nut 46 and is formed of a shaft 52, a locating member 54, and a sleeve 56.

The sleeve 56 has a closed end which is provided at the center with a threaded hole 58 which is engaged with the first outer threaded portion of the shaft. The sleeve 56 has an embossed portion 60 to provide friction to facilitate the turning of the sleeve 56.

What is claimed is:

1. A connection device of a boring saw, said connection device connecting a rotating tool with a rotating body and a bit, the rotating body having an inner threaded portion and at least one locating hole, said connection device comprising:

a shaft having a shaft hole for receiving one end of a bit, a connection portion located at one end of said shaft for connecting the rotating tool, an urging ring extending radially from a shank of said shaft and having at least one through hole extending along the longitudinal direction of said shaft, a first outer threaded portion located between said connection portion and said urging ring, and a second outer threaded portion located at a free end of said shaft and engaged with the inner threaded portion of the rotating body;

a locating member comprising an annular portion fitted over said shaft, and at least one insertion pin extending longitudinally from said annular portion to insert into said through hole of said urging ring and the locating hole of the rotating body;

a sleeve having a closed end which is provided with a through hole to receive said shaft, said urging ring, and said locating member; and a nut engaged with said first outer threaded portion of said shaft such that said nut urges said closed end of said sleeve to be in an intimate contact with the closed end of the rotating body.

2. A connection device of a boring saw, said connection device connecting a rotating tool with a rotating body and a bit, the rotating body having an inner threaded portion and at least one locating hole, said connection device comprising:

a shaft having a shaft hole for receiving one end of a bit, a connection portion located at one end of said shaft for connecting the rotating tool, an urging ring extending radially from a shank of said shaft and having at least one through hole extending along the longitudinal direction of said shaft, a first outer threaded portion located between said connection portion and said urging ring, and a second outer threaded portion located at a free end of said shaft and engaged with the inner threaded portion of the rotating body;

a locating member comprising an annular portion fitted over said shaft, and at least one insertion pin extending longitudinally from said annular portion to insert into said through hole of said urging ring and the locating hole of the rotating body; and a sleeve having a closed end which is provided with a threaded through hole whereby said threaded through hole is engaged with said first outer threaded portion of said shaft such that said sleeve is fitted over said locating member and said urging ring of said shaft, and that said sleeve urges the closed end of the rotating body, thereby fastening securely said shaft with the rotating body.

3. The connection device as defined in claim 2, wherein said closed end of said sleeve is provided with an embossed portion to provide friction to facilitate the turning of said sleeve.

* * * * *